(No Model.)
O. B. SHALLENBERGER.
ELECTRICAL INDICATOR.
No. 383,670. Patented May 29, 1888.
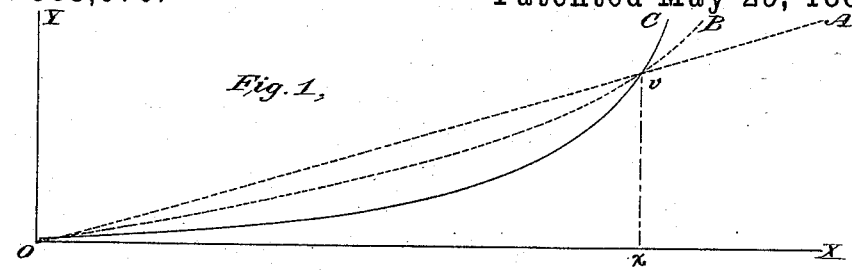
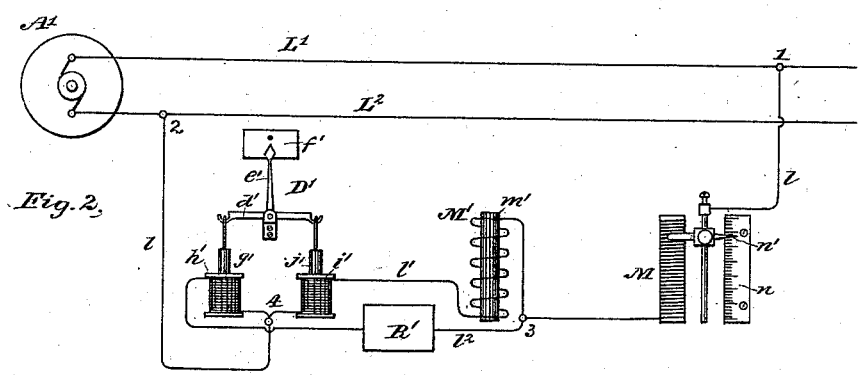
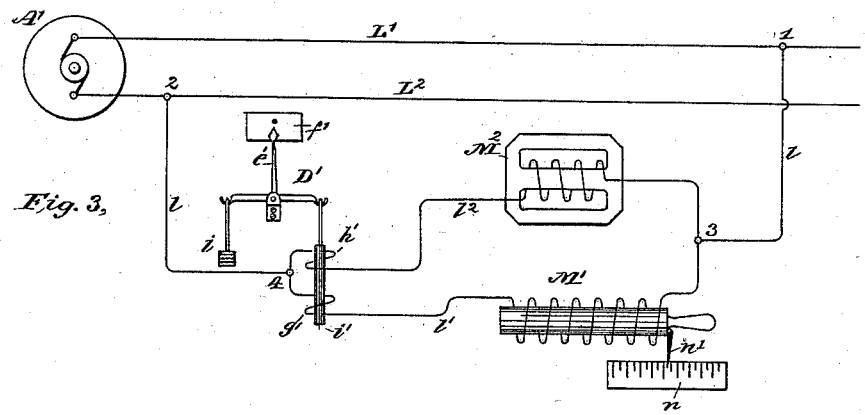
WITNESSES:
INVENTOR,
O. B. Shallenberger
by Pope Edgcomb & Ferry Att'ys,

UNITED STATES PATENT OFFICE.

OLIVER B. SHALLENBERGER, OF ROCHESTER, ASSIGNOR TO THE WESTINGHOUSE ELECTRIC COMPANY, OF PITTSBURG, PENNSYLVANIA.

ELECTRICAL INDICATOR.

SPECIFICATION forming part of Letters Patent No. 383,670, dated May 29, 1888.

Application filed January 21, 1888. Serial No. 261,469. (No model.)

*To all whom it may concern:*

Be it known that I, OLIVER B. SHALLENBERGER, a citizen of the United States, residing in Rochester, in the county of Beaver, in the State of Pennsylvania, have invented certain new and useful Improvements in Electric Indicators, (Case 196,) of which the following is a specification.

The invention relates to the class of apparatus employed for indicating the current upon an electric circuit or the difference of potential existing between two points in the circuit.

The object of the invention is to provide convenient, effective, and reliable means for determining whether the difference of potential existing between two given points in an electric circuit supplied with alternating, intermittent, or pulsatory electric currents rises above or falls below a normal point and the amount of divergence therefrom.

The invention consists in transmitting currents due to the difference of potential existing at the points upon two branch circuits of different self-inductions, and in placing in each branch circuit a solenoid or electro-magnet. These solenoids act in opposition upon a suitable indicating device, and thus the currents traversing the two are compared with each other. The currents traversing the two branches cause variations in their apparent relative resistances accordingly as they rise above or fall below the normal or predetermined potential. This is due to the fact that the self-induction devices, when traversed by alternating, intermittent, or pulsatory electric currents, develop a certain counter electro-motive force when the difference of potential has a given value, which is in each of the proper amount to cause their effects upon the indicating device to exactly neutralize each other; but since the form of the self-induction devices or their proportions are different any change will cause the apparent resistance of one to vary with respect to the other, thus causing a different distribution of current and consequent unbalancing of the indicating device. Under such circumstances, therefore, a greater proportion of current will traverse one branch or the other, accordingly as the difference of potential rises above or falls below the predetermined normal point. An additional resistance may be employed for cutting down the current to such a point as may be desired, and this may be adjustable and serve, also, for correcting slight variations in the number of alternations in the current in case it is necessary.

In the accompanying drawings, Figure 1 is a theoretical diagram illustrating the law of the increase of current, and Figs. 2 and 3 illustrate methods of carrying out the invention.

Referring to Fig. 1, the vertical axis O Y is taken as the direction in which the current is measured, and the horizontal axis O X the corresponding values of electro-motive force. By Ohm's law it is known that the value of a given current is always proportional to the electro-motive force, the resistance being constant. The law of increase of current through such a resistance is therefore represented by a straight line, O A; but if the resistance from any cause decreases as the electro-motive force increases then the current will increase in a greater ratio, and their relation will be indicated by a curved line, such as O B. Circuits may, however, be so organized that their apparent resistance will change at different rates. Thus another circuit might be caused to decrease its resistance at such a rate that the relation of the current to the electro-motive force would be indicated by the line O C.

A coil of wire provided with an iron core has the quality of opposing to an alternating or variable current a counter electro-motive force or apparent resistance much greater than that due to the actual resistance of the conductor itself. This apparent resistance does not with a varying current bear a fixed ratio to the actual resistance, and may in coils of different forms follow different laws of variation, as represented by the lines O B and O C. By suitably proportioning two coils the equal currents may traverse them at any given electro-motive force, as indicated at O $x'$, as shown by the intersection of O B and O C at $v$, while at any value of electro-motive force greater or less than O $x'$ the currents are unequal. The same may be said of a simple resistance having the law shown at O A and either of the coils following the law O B or O C.

In Fig. 2 there is shown a method of carrying out the invention. A' represents a source of alternating, intermittent, or pulsatory electric currents, and L' L² main-line conductors leading therefrom to a work-circuit of any suitable character. If it is required to determine the difference of potential between points 1 and 2 upon these conductors, a conductor, $l$, is led from the point 1 in the line L' to the point 2 in the line L². This conductor is divided between points 3 and 4 into branch conductors $l'$ and $l^2$. The branch $l'$ contains a self-induction device, M', consisting of a coil of wire surrounding a core, $m'$. It also includes one coil, $i'$, applied to an indicator, D'.

The branch $l^2$ contains a constant resistance, R', which may be adjustable, and also a second coil, $h'$, of the indicator D'. The coils $i'$ and $h'$ are provided with cores $j'$ and $g'$, preferably of soft-iron wires, insulated from each other, and they are respectively supported upon opposite ends of a beam, $d'$. This carries the pointer $e'$, applied to the scale $f'$.

An adjustable resistance, M, may be included in the conductor $l$ between the points 1 and 3, and this is here shown as provided with a scale, $n$, and indicator $n'$.

A determined difference of potential is produced between the points 3 and 4, and the difference of potential between the points 1 and 2 may be determined by adding the difference of potential at the terminals of the resistance M, which is known by the scale. For this purpose the resistance M has been previously measured and calibrated, so that by noting the position of the indicator the resistance in the circuit may be determined, and thus the difference of potential which will exist at its terminals may be known. If the electro-motive force rises beyond the predetermined point, then the increase of difference of potential between the points 3 and 4 will cause the apparent resistance of the self-inductor M' to be decreased, thus causing a greater proportion of current to traverse the branch $l'$. This, acting through the solenoid $i'$, will move the indicator $e'$ in a given direction. If, however, the difference of potential falls below the predetermined point, then the apparent resistance of the self-induction device will be greater than that of the resistance R', and a greater proportion of current will traverse the branch $l^2$ and move the indicator in the opposite direction. By thus adjusting the resistance M until the indicator $e'$ comes to its zero-point the difference of potential existing between the points 1 and 2 may be readily indicated.

In Fig. 3 a slightly-different organization is shown. In this instance two self-induction devices, M' and M², are employed. In this instance the device M' is made adjustable, having a pointer, $n'$, applied to a scale, $n$. The two self-induction devices are of different form, and so proportioned that their self-inductions will vary in different ratios or they have a different law of change under the same circumstances. Thus the device M' may have the law of change represented in the diagram, Fig. 1, by the line O B, while the device M² varies according to the line O C. By adjusting the core $m'$ the balance under the influence of the required difference of potential at the points 3 and 4 may be obtained. Then an increase of difference of potential will cause one of the devices to decrease its apparent resistance more rapidly than the other, and likewise a decrease of difference of potential will cause it to increase its apparent resistance more rapidly than the other. If the difference of potential between the points 3 and 4 which is required to obtain the balance of the indicator D' is known, then in case of a variation in the difference of potential such increase or decrease may be determined by adjusting the core $m'$ until the balance is restored and noting the change upon the scale $n$. In this instance the coils $h'$ and $i'$ are shown as applied to a single core, $g'$, being wound in opposite directions, and therefore having a differential action thereon. The weight of the core is balanced by a weight, $i$.

I claim as my invention—

1. The combination of an electric conductor, branch circuits for the same, a self-induction device in one branch, a resistance included in the other branch, opposing solenoids included in the respective branches, and an indicator acted upon by alternating, intermittent, or pulsatory electric currents traversing said solenoids.

2. An electric indicator consisting of two branch circuits, a self-induction device in one branch, means for balancing the normal apparent resistance of the self-induction device in the other branch, two opposing solenoids in the respective branches, and an indicator for alternating, intermittent, or pulsatory electric currents, to which said solenoids are applied.

3. An electric indicator for alternating, intermittent, or pulsatory electric currents, consisting of two branch circuits, a self-induction device in one branch, means for balancing the normal apparent resistance of the self-induction device in the other branch, two opposing solenoids in the respective branches, an indicator to which said solenoids are applied, and an adjustable resistance connected in the conductor leading to said branch circuits.

4. The combination of a source of alternating, intermittent, or pulsatory electric currents, conductors L' and L², leading therefrom, a conductor, $l$, leading from the conductor L' to the conductor L², and having a portion of its length divided in branches $l'$ and $l^2$, a self-induction device included in one branch, and a resistance, R', included in the other branch, substantially as described.

5. An electrical indicator for alternating, intermittent, or pulsatory electric currents, consisting of an indicating device having differential coils, and two reactive coils of unlike self-induction connected in circuit with the respective coils of the indicator.

In testimony whereof I have hereunto subscribed my name this 10th day of January, A. D. 1888.

OLIVER B. SHALLENBERGER.

Witnesses:
  W. D. UPTEGRAFF,
  DANL. W. EDGECOMB.